J. O. BUTTON.
Fruit-Driers.

No. 155,286. Patented Sept. 22, 1874.

Witnesses:
L. P. Himer
C. L. Euch.

Inventor:
J. Orlando Button
By J. M. C. Perkins,
Attorney.

2 Sheets--Sheet 2.

J. O. BUTTON.
Fruit-Driers.

No. 155,286. Patented Sept. 22, 1874.

Witnesses;
L. P. Himer
C. L. Everts

Inventor;
J. Orlando Button
By J. M. C. Perkins,
Attorney.

UNITED STATES PATENT OFFICE.

JOEL ORLANDO BUTTON, OF HOPKINS, MICHIGAN.

IMPROVEMENT IN FRUIT-DRIERS.

Specification forming part of Letters Patent No. 155,286, dated September 22, 1874; application filed July 20, 1874.

*To all whom it may concern:*

Be it known that I, JOEL ORLANDO BUTTON, of Hopkins, in the county of Allegan and State of Michigan, have invented certain new and useful Improvements in Fruit and Vegetable Driers; and I do hereby declare the following to be a full, clear, and exact description thereof, reference being had to the accompanying drawing and to the letters of reference marked thereon, forming part of this specification, and in which—

Figure 1:
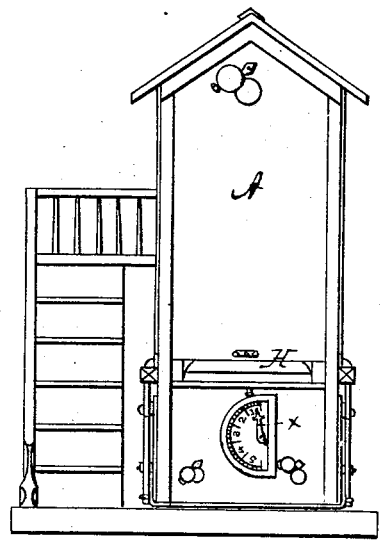
Figure 2:
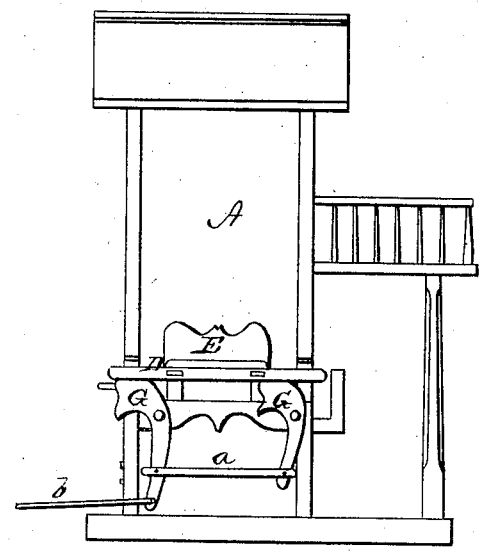
Figure 3:
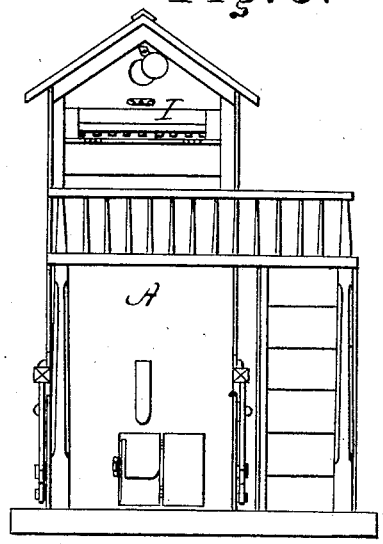
Figure 4:
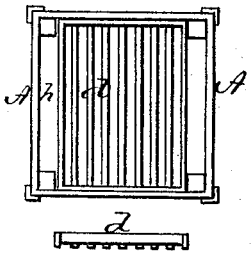
Figure 5:
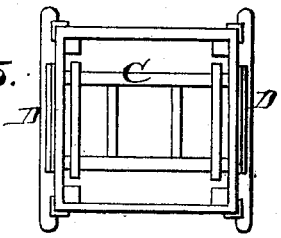

Figure 1 is a front view, Fig. 2 a side elevation, and Fig. 3 a rear view, of my drier; Figs. 4 and 5 are horizontal sections, and Figs. 6 and 7 vertical sections, of the same.

Figure 6:
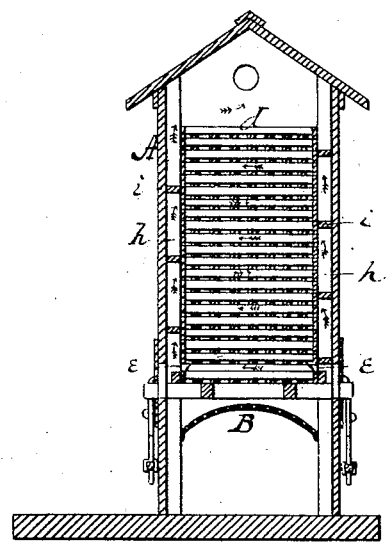
Figure 7:
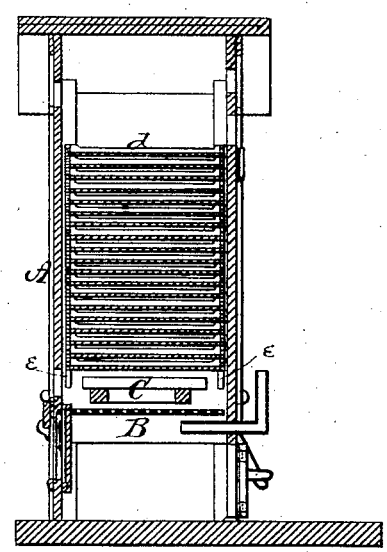

A represents the shell of the drier, provided with a suitable hot-air furnace in the bottom, over which is an arch, B, of sheet iron. This arch is perforated, as shown in Figs. 6 and 7, to mellow the heated air before coming in contact with the fruit nearest to the heater. Above this arch, within the drier, is a frame, C, for raising the racks, the ends of said frame projecting through the sides of the drier, and on the outside thereof provided with a cross-bar, D. To this cross-bar are attached wings E, for closing the openings in the sides of the drier, as the frame C moves up and down. On each side of the drier are pivoted two cam-levers, G G, for raising the frame C, which levers are connected by a rod, a, and a handle or bail, b, is attached to one lever on each side to insure uniformity in their movement. d d represent the racks, which rest upon each other, and are made with openings in their sides to let the heated air pass through them. e e are spring-catches—one in each corner—for supporting the racks after they are elevated. These catches move back while a rack is being elevated, and as soon as the rack passes they spring out and support the rack while the frame is lowered for another rack. The racks d do not extend to the sides of the drier, but leave a hot-air space, h, on two sides thereof, and in these spaces are alternately placed stops i i, which compel the heated air to take a zigzag course through the racks from side to side until it reaches the top. Suitable ventilators or registers are provided at top and bottom of the drier, to be adjusted to suit the necessity of the current. The fruit in the racks prevents the heated air from rising directly upward, consequently a current is formed through the racks and up the sides, as described. The radiating heat from the main current is sufficient to dry the intervening racks.

By this arrangement all the properties of the fruit, which would otherwise be lost by evaporation, are retained by the drier fruit above absorbing that which rises from the green fruit below. The heated air as it leaves the top rack is perfectly dry, and leaves the fruit perfectly natural, except that the water has been taken out.

This drier is simple in construction, durable, and reliable, and not liable to get out of order, and easily operated.

The racks are inserted through a door, H, immediately above the frame C, one by one, and each one separately elevated by the levers G till it is held by the catches e e, and the next rack when it is elevated raises the first one, and so on until the racks can be taken out, one by one, at the top through the door I.

In connection with the furnace is a pointer, x, operated by the expansion of a rod to indicate the degree of heat.

Having thus fully described my invention, what I claim as new, and desire to secure by Letters Patent, is—

1. The spring-catches e e, elevating-frame C, cross-head D, and cam-levers G G, in combination, substantially as and for the purpose set forth.

2. The cross-head D, guided in slots in the house or drier, and having the wings E E, in combination, with the cam-levers G G, and bail or handle for operating the latter, substantially as and for the purpose set forth.

In witness that I claim the foregoing I have hereunto set my hand this 16th day of June, 1874.

J. ORLANDO BUTTON.

In presence of—
  E. W. PICKETT,
  ANN R. PICKETT.